(12) United States Patent
Thoms

(10) Patent No.: US 7,438,800 B2
(45) Date of Patent: Oct. 21, 2008

(54) ARRANGEMENT FOR FILTERING HYDRAULIC FLUID

(75) Inventor: Reinhardt Thoms, Neumunster (DE)

(73) Assignee: Sauer-Danfoss Inc., Ames, IA (US)

( * ) Notice: Subject to any disclaimer, the term of this patent is extended or adjusted under 35 U.S.C. 154(b) by 492 days.

(21) Appl. No.: 10/974,259

(22) Filed: Oct. 27, 2004

(65) Prior Publication Data

US 2005/0121373 A1  Jun. 9, 2005

(30) Foreign Application Priority Data

Dec. 8, 2003  (DE) ................ 103 57 217

(51) Int. Cl.
*B01D 27/10* (2006.01)

(52) U.S. Cl. ............. 210/90; 73/744; 137/554; 210/130; 210/420; 210/433.1

(58) Field of Classification Search ........... 210/85, 210/90, 130–133, 416.1, 420, 433.1, 91; 137/487.5, 554, 599.11, 553; 417/14, 63; 55/312, 314; 73/744, 745
See application file for complete search history.

(56) References Cited

U.S. PATENT DOCUMENTS

| | | | | |
|---|---|---|---|---|
| 2,748,947 A * | 6/1956 | Jay | ............................ | 210/130 |
| 3,335,863 A * | 8/1967 | Silverwater | ................... | 210/90 |
| 3,485,368 A * | 12/1969 | Berta | .......................... | 210/90 |
| 3,777,888 A * | 12/1973 | Zellbeck et al. | ............. | 210/130 |
| 4,205,703 A * | 6/1980 | Silverwater | ................. | 137/557 |
| 4,740,140 A * | 4/1988 | Benson | ......................... | 417/63 |
| 6,126,818 A * | 10/2000 | Duerrstein et al. | ........... | 210/132 |
| 6,908,545 B2 * | 6/2005 | Mouhebaty et al. | .......... | 210/132 |

\* cited by examiner

*Primary Examiner*—Joseph W Drodge

(57) ABSTRACT

An arrangement for filtering a hydraulic fluid having a bypass line connecting the feed channel to the discharge channel where the bypass line is opened by a pressure switching valve when a pressure change is caused by the contamination of the filter element.

12 Claims, 4 Drawing Sheets a.)

b.)

c.)

ARRANGEMENT FOR FILTERING HYDRAULIC FLUID

BACKGROUND OF THE INVENTION

The invention relates to an arrangement for filtering hydraulic fluid at least one filter element in a hydraulic circuit, having a feed channel which leads the unfiltered hydraulic fluid to the filter element, having a discharge channel which leads away the filtered hydraulic fluid out of the filter element, having a bypass line which connects the feed channel to the discharge channel, with the filter element being bypassed in the process, having a pressure switching valve which is arranged in the bypass line and, in the case of a certain change in pressure caused by the contamination of the filter, opens the bypass line, and having a means for indicating the state of contamination of the filter element, this arrangement being in accordance with the preamble of claim 1.

Such an arrangement belongs to the prior art and is known, for example, from various ranges of axial piston pumps which are available on the market from the applicant. In this case, the filter element is configured, for example, as a full-flow filter with an upstream filling pump and is often combined with the axial piston pump. Bypassing the contaminated filter element by a bypass line has the advantage that, although contaminated hydraulic fluid is delivered, malfunctioning of the axial piston machine is avoided. It is nevertheless necessary to obtain information regarding the degree of contamination of the filter element. The means for indicating the state of contamination of the filter element is used for this purpose. The pressure switching valve in the bypass line and the indicating means are separate devices, in the case of the prior art, which both operate reliably and thus have to be configured and installed with a certain amount of care.

The object of the invention is to provide an arrangement of the type mentioned in the introduction which is of simplified design, operates reliably and provides for further information-giving and control possibilities.

SUMMARY OF THE INVENTION

This object is achieved, in the case of an arrangement according to the preamble of claim 1, by the features of the defining part of claim 1, that is to say the object is achieved in that the pressure switching valve is designed, at the same time, as a means for indicating the state of contamination of the filter element.

According to the invention, the two known devices are combined. The structural outlay is thus reduced, as a result of which the production costs are also reduced. In particular, it is necessary to provide just one of each precisely operating part, in particular the pressure switching valve, and these parts can be utilized a number of times. The entire subassembly to which the arrangement according to the invention belongs is thus "cleared out" and has a more defined construction. Finally, the fact that an indicating means is joined together with the precisely operating pressure switching valve makes it possible for the arrangement according to the invention to initiate further control operations reliably. Thus, for example, the quantity of hydraulic fluid which flows through the filter element and/or the bypass line can be influenced via the pressure switching valve and the indicating means.

Advantageous configurations of the arrangement according to the invention are specified in the subclaims.

It is thus possible for the pressure switching valve to be controlled by the pressure of the hydraulic fluid which prevails upstream of the filter element or by the difference in pressure of the hydraulic fluid at the filter element.

It is further advantageous to configure the pressure switching valve as a longitudinal slide with a control piston which can be displaced counter to spring force, and also by a position-sensing device, which can evaluate and indicate one or more certain positions of the control piston which come about under the influence of the pressure of the hydraulic fluid at the filter element. This is because linearly displaceable longitudinal slides allow particularly precise sensing of changes in pressure. The pressure switching element is, to a certain extent, the initiating component of the indicating means.

According to further configurations, the changing position of the control piston can be transmitted to an evaluating and indicating unit mechanically or non-mechanically, that is to say, for example, also inductively, capacitively or magnetically, it being possible for the evaluating and indicating unit to operate with optical, acoustic or electrical means.

It is particularly preferred here if a permanent magnet is connected to the control piston, the position of this permanent magnet being sensed and indicated by way of one or more reed switches. An electrical signal relating to the state of pressure at the filter element is thus obtained in the evaluating and indicating unit, this signal being particularly suitable for initiating further control operations.

It is thus possible to provide, for example, that the electrical evaluating and indicating unit is operatively connected to a device which, in accordance with the position of the control piston, reduces the quantity of hydraulic fluid which flows to the filter element and/or the bypass line.

The reduction can take place, for example, by a bypass line being opened to the delivery mechanism by means of which the hydraulic fluid which is to be filtered is delivered to the filter element. The point of this control is that the hydraulic fluid which bypasses the filter element by means of the bypass line does not get fed into the closed circuit.

A further possibility, in addition, is for the electrical evaluating and indicating unit to be operatively connected to a device which, in accordance with the position of the control piston, reduces the delivery rate of a pump which delivers the hydraulic fluid through the hydraulic circuit.

At least the filter element, the bypass line, the longitudinal slide and the Position-sensing device are advantageously combined by the arrangement according to the invention to form a compact structural unit which for example, depending on the application case, can be produced in graduated sizes and easily be introduced into the relevant hydraulic circuit.

In respect of the sensitivity to temperature of hydraulic control devices, further refinements are also carried out for the monitoring of the filter element by means of the arrangement according to the invention.

It is thus possible to install a temperature-sensing device which, when the temperature drops below a certain minimum value, activates the device for reducing the quantity of hydraulic fluid which flows to the filter element and/or through the bypass line and/or the device for reducing the delivery rate of the pump for the hydraulic circuit.

As an alternative, it may also be provided that the temperature-sensing device, when the temperature drops below a certain minimum value, switches off the entire arrangement.

These measures avoid the situation where excessively low temperatures of the hydraulic fluid, for example at the beginning of operation or as a result of external influences, give rise to misinformation regarding the state of contamination of the filter element or to incorrect operation. The temperature sensing can take place by means of a bimetallic strip.

A further refinement of the arrangement according to the invention may consist in the latter being connected to a device for sensing operating duration. The configuration here may be such that the evaluating and indicating unit is activated only after a certain minimum operating duration, it is likewise possible for the delivery rate of the pump which delivers the hydraulic fluid through the hydraulic circuit to be increased only after a certain minimum operating duration. The point of these last configurations is that the hydraulic fluid is still cold in any case at the beginning of operation and excessive loading of the pump should be avoided.

The invention is explained in yet more detail herein below by way of an exemplary embodiment.

DETAILED DESCRIPTION OF THE PREFERRED EMBODIMENT

Figure 1:
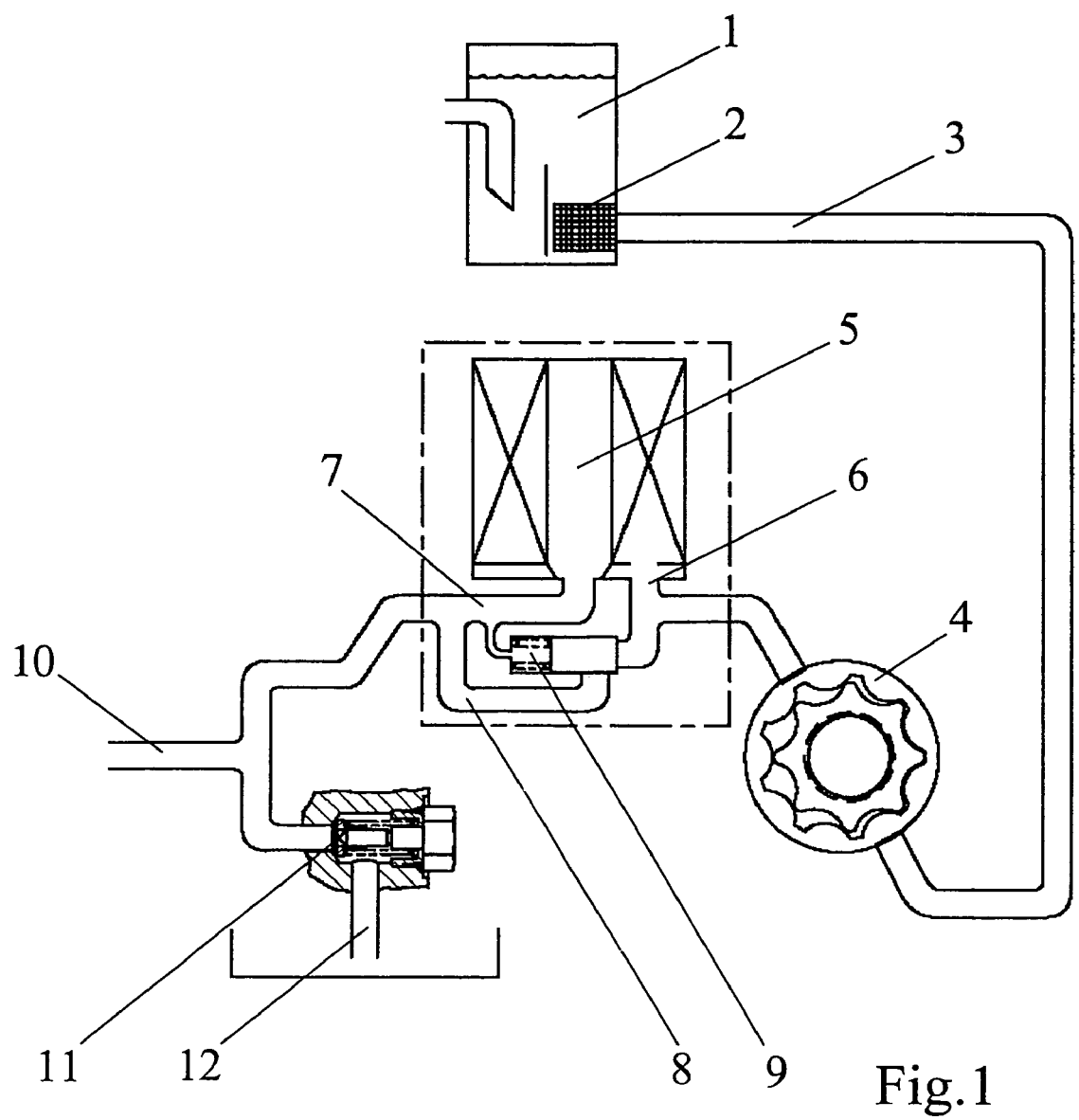
FIG. 1 illustrates the principle of pressure filtering according to the prior art, use being made of the arrangement according to the invention.

FIG. 1 shows a hydraulic circuit in which the arrangement according to the invention is used. The hydraulic circuit here is a filling pressure circuit in which filtering takes place in full flow. From a pressurized-fluid container 1, the hydraulic fluid flows via a screen 2, through an intake line 3, to the filling pump 4. The latter delivers the hydraulic fluid through a feed channel 6 to the filter element 5. The filter element 5 thus receives unfiltered hydraulic fluid. The filtered hydraulic fluid leaves the filter element via the discharge channel 7 and passes, via the line 10, to the low-pressure side of the filling circuit. 11 designates a filling-pressure limiting valve which produces the connection 12 to an axial piston machine. Depending on the position of the filling-pressure limiting valve, the hydraulic fluid is delivered from the pressurized-fluid container 1, via the line 10, to the low-pressure side of the filling circuit or through the axial piston machine.

The feed channel 6 for the unfiltered hydraulic fluid and the discharge channel 7 for the filtered hydraulic fluid leaving the filter element are connected to one another via a bypass line 8, which is merely schematically illustrated in FIG. 1. 9 designates a pressure switching valve by means of which, depending on the degree of contamination of the filter element 5, the hydraulic fluid delivered by the filling pump 4 is delivered either into the filter element or, via the bypass line 8, directly into the discharge channel and thus to the low-pressure side of the filling circuit. The circuit which has been described thus far belongs to the prior art.

Figure 2:
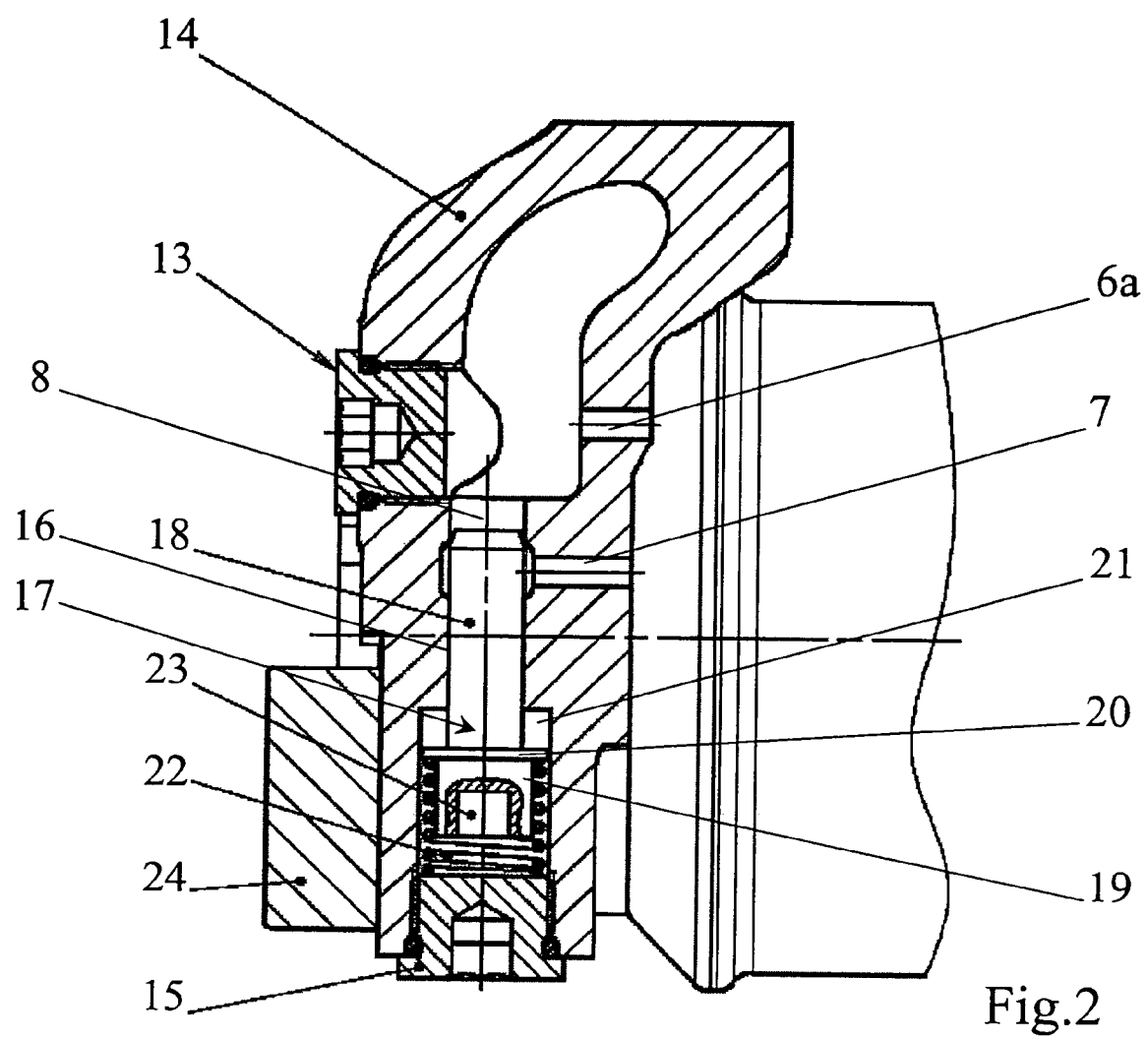
FIG. 2 shows the technical configuration of the arrangement according to the invention in a first exemplary embodiment.

FIG. 2 illustrates the pressure switching valve 9 in detail, e.g. as a differential pressure indicator. Together with the evaluating and indicating unit 24, it forms the arrangement according to the invention. The latter may be assembled with an axial piston machine, for example a hydraulic pump. In this case, 14 forms a part housing which is connected to the filter element 5. 6, once again, designates the feed channel for the unfiltered hydraulic fluid, which flows to the filter element via a branch channel 6a. The space downstream of the filter element forms a discharge channel 7, which is also connected to the part housing 14. 13 and 15 designate closure plugs which close bores in the part housing 14. The part housing 14 has a cylinder bore 16 of stepped diameter. The control piston 17 is mounted in a displaceable manner in the cylinder bore 16. The control piston 17 is made up of a control stem 18, the spring stem 19 and a stop plate 20. Butting against the stop plate 20 is a helical spring 22, which has its other end supported on the closure plug 15. The helical spring 22 tries to push the control piston 17, via the stop plate 20, against the stepped formation of the part housing 14. The helical spring 22 here is accommodated in the spring channel 21, the diameter of which corresponds to that of the stop plate 20.

In the case of the exemplary embodiment according to FIG. 2, the position of the control piston 17 in the part housing 14 is determined by the pressure of the hydraulic fluid which prevails in the feed channel 6. This is the pressure of the hydraulic fluid which prevails upstream of the filter element 5, and thus serves as control pressure. The pressure on the rear side of the control piston 17, that is to say on the side of the helical spring 22, may be equal, at most, to the pressure in the discharge channel 7, that is to say the pressure downstream of the filter element 5. However, it may also be lower, e.g. equal to atmospheric pressure. As the contamination of the filter element increases, the pressure of the hydraulic fluid which prevails upstream of the filter element will increase and result in the control piston 17 yielding back counter to the force of the helical spring 22. In this way, the free end surface of the control piston 17 will finally pass into the region of the discharge channel 7, as a result of which the feed channel 6 and discharge channel 7 are connected via the bypass line 8.

The control piston 17 is provided with a permanent magnet 23 in the region of its spring stem 19. As a result of magnetic coupling, this permanent magnet transmits an indication of its position to the electrically operating evaluating and indicating unit 24.

Figure 3:
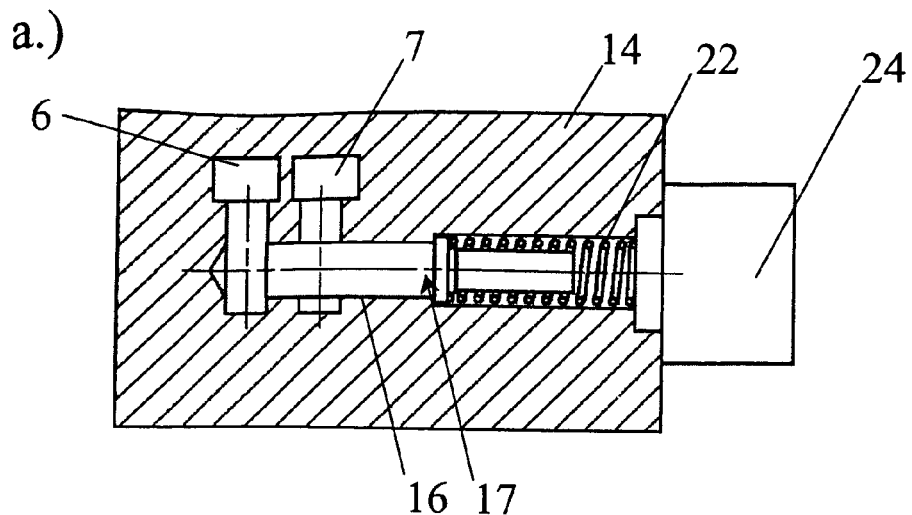
FIG. 3a contains the illustration of the uncontaminated position of the control piston.
FIG. 3b contains the illustration of an increased contamination position of the control piston.
FIG. 3c contains the illustration of the full contaminated position of the control piston.
Figure 3:
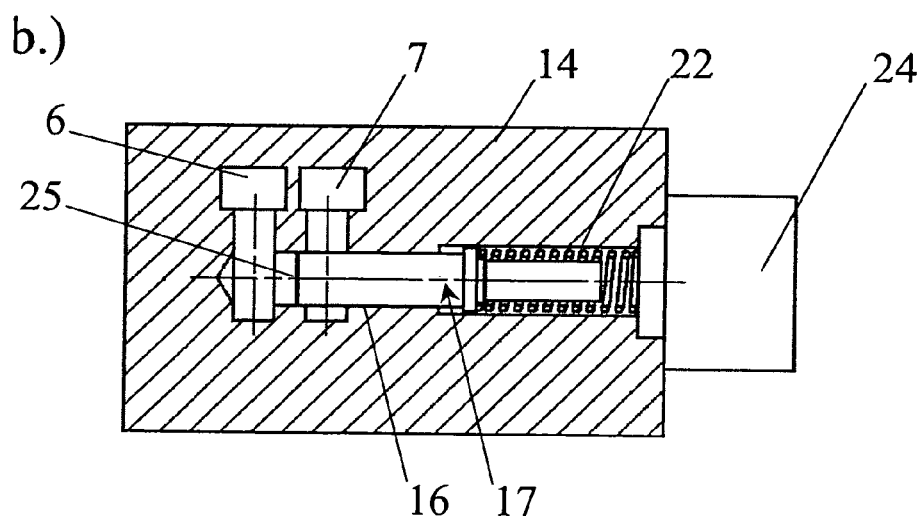
Figure 3:
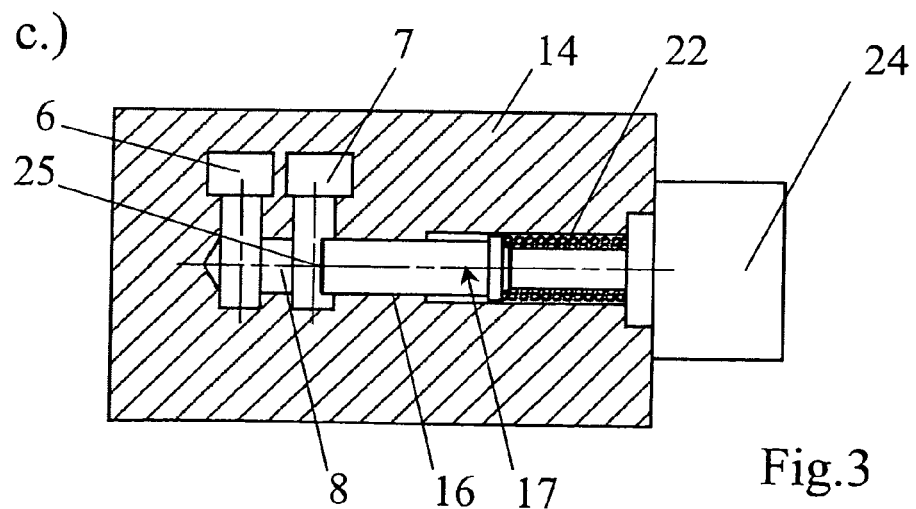

The operation of the arrangement according to the invention is explained in yet more detail with reference to FIG. 3. FIG. 3 shows a simplified and slightly modified form of an arrangement corresponding to FIG. 2. In this case, parts with an identical function are provided with the same designations as in FIGS. 1 and 2. FIGS. 3a to 3c differ from one another by way of different positions of the control piston 17.

It is thus also the case in FIG. 3 that 6 designates the feed channel for the unfiltered hydraulic fluid and 7 designates the discharge channel for the hydraulic fluid located downstream of the filter element. The feed channel 6 and discharge channel 7 are led into the part housing 14 and are connected there to the cylinder bore 16 for the control piston 17. The respective position of the control piston 17 is transmitted to the evaluating and indicating device 24 in the manner which has already been described.

The unfiltered hydraulic fluid acts, via the feed channel 6, on the end surface 25 of the control piston 17. FIG. 3a shows the state in which the filter element is not as yet contaminated. The pressure of the hydraulic fluid upstream of the filter element remains comparatively low, with the result that the force of the helical spring 22 is sufficient in order to push the control piston 17 against the stop in the housing 14.

As the contamination of the filter increases, however, so too does the pressure of the hydraulic fluid on the end surface 25 of the control piston 17 increase, with the result that this control piston yields back, with the helical spring 22 being compressed in the process. This state is shown in FIG. 3b.

When, finally, the filter element has been contaminated to such a pronounced extent that sufficient filtering is no longer ensured, the pressure acting on the end surface 25 of the control piston 17 increases such that the helical spring 22 is fully compressed. The control piston moves back, by way of its end surface, into the region of the discharge channel 7. In this way, a section of the cylinder bore 16 forms the bypass line 8, by means of which the feed channel 6 is connected to the discharge channel 7. This state is shown in FIG. 3c. In this case, rather than all of the hydraulic fluid passing to the filter element, some is channeled directly downstream of the latter.

The action of the control slide 17 yielding back under the pressure of the hydraulic fluid which prevails upstream of the filter element is constantly transmitted to the evaluating and indicating device 24. In addition to the already mentioned magnetic coupling of the control piston to an electrical evaluating and indicating unit, inductive or capacitive and mechanical coupling are also possible. Optical or acoustic means can also be used for evaluating and indicating purposes.

In the case of the arrangement according to the invention, the pressure switching valve, for connecting the feed channel 6 and discharge channel 7, is thus combined with a means for indicating the degree of filter contamination The arrangement according to the invention thus has the advantage of a particularly compact construction comprising only a small number of parts. The production costs are thus also reduced as a result.

The information regarding the position of the control piston which is given by the arrangement according to the invention can also be used for further control purposes. Thus, the evaluating and indicating unit 24 may be connected up to a device which, in accordance with the position of the control piston, reduces the quantity of hydraulic fluid which flows to the filter element and/or the bypass line. Furthermore, it is also possible to reduce the overall delivery rate of the hydraulic circuit by the delivery rate of the pump 4 being reduced when the filter element is contaminated to a relatively pronounced extent. This has the advantage that the quantity of hydraulic fluid which bypasses the filter element via the bypass line is reduced or done away with altogether.

Figure 4:
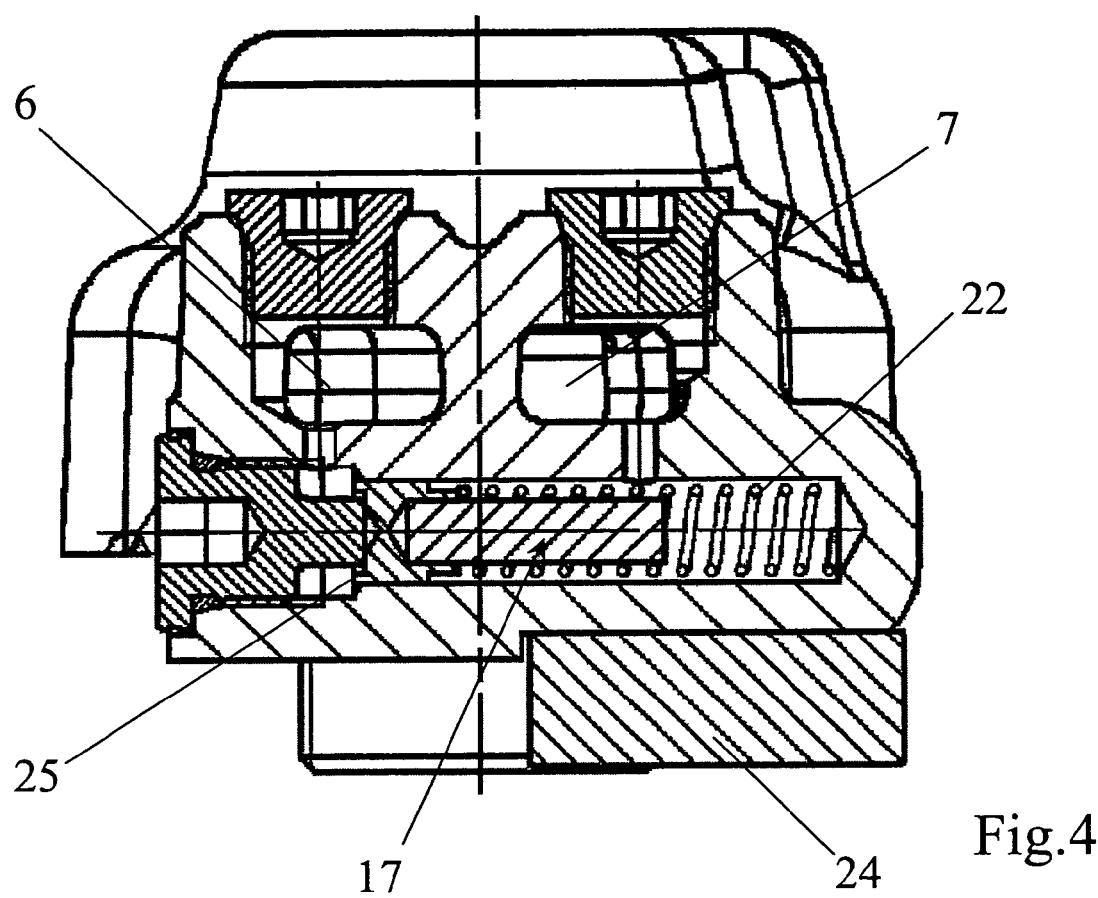
FIG. 4 relates to a detail during the functioning of the control piston.

A further detail of a modified arrangement according to the invention is explained with reference to FIG. 4. Whereas, in the case of the configurations according to FIGS. 2 and 3, the control piston 17 is controlled via the pressure of the hydraulic fluid which prevails upstream of the filter element 5, FIG. 4 shows the Possibility of using the differential pressure of the hydraulic fluid at the filter element 5 as the controlled variable. For this purpose, the feed channel 6 is connected to the front end surface 25 of the control piston 17, while the discharge channel 7 is led to the Opposite end of the control piston 17, at which the helical spring 22 is located. In this way, the control piston 17 is exposed to the differential pressure prevailing at the filter element 5. The arrangement according to FIG. 4 is otherwise designed in the manner which has already been described with reference to FIGS. 2 and 3; this applies, in particular, in respect of the coupling of the control piston 17 to the evaluating and indicating unit 24.

What is claimed is:

1. An arrangement for filtering hydraulic fluid through at least one filter element in a hydraulic circuit, having a feed channel which leads the unfiltered hydraulic fluid to the filter element, having a discharge channel which leads away the filtered hydraulic fluid out of the filter element, having a bypass line which connects the feed channel to the discharge channel, with the filter element being bypassed in the process, having a pressure switching valve which is arranged in the bypass line and, in the case of a certain change in pressure caused by the contamination of the filter, opens the bypass line, and having a means for indicating the state of contamination of the filter element, wherein the pressure switching valve (9) is designed, at the same time, as a means for indicating the state of contamination of the filter element (5); and a position-sensing device, which can sense, evaluate and indicate one or more certain positions of a control piston (17) which come about under the influence of the pressure of the hydraulic fluid at the filter element (5); the control piston (17) being coupled to an electrical evaluating and indicating unit (24); wherein the evaluating and indicating unit (24) is operatively connected to a device which, in accordance with the position of the control piston (17), reduces the quantity of hydraulic fluid which flows to the filter element (5) and the bypass line (8).

2. The arrangement as claimed in claim 1, wherein the pressure switching valve (9) is controlled by the pressure of the hydraulic fluid which prevails upstream of the filter element (5).

3. The arrangement as claimed in claim 1, wherein the pressure switching valve (9) is controlled by the difference in pressure of the hydraulic fluid at the filter element (5).

4. The arrangement as claimed in claim 1, which comprises the control piston (17) being coupled mechanically to the optical, acoustic or electrical evaluating and indicating unit (24).

5. The arrangement as claimed in claim 1, which comprises non-mechanical coupling of the control piston (17) to an optical, acoustic or electrical evaluating and indicating unit (24).

6. The arrangement as claimed in claim 5, wherein a permanent magnet (23) is connected to the control piston (17), the position of this permanent magnet being sensed and indicated by way of one or more reed switches.

7. The arrangement as claimed in claim 1 with an electrical evaluating and indicating unit (24), wherein this is operatively connected to a device which, in accordance with the position of the control piston (17), reduces the delivery rate of a pump (4) which delivers the hydraulic fluid through the hydraulic circuit.

8. The arrangement as claimed in claim 1, wherein the filter element (5), the bypass line (8) the longitudinal slide and the position-sensing device are combined to form a compact structural unit in the hydraulic circuit.

9. The arrangement as claimed in claim 1, which comprises the installation of a temperature-sensing device which, when the temperature drops below a certain minimum value, activates the device for reducing the quantity of hydraulic fluid which flows to the filter element (5) and through the bypass line (8) and the device for reducing the delivery rate of the pump (4) for the hydraulic circuit.

10. The arrangement as claimed in claim 1, which comprises the installation of a temperature-sensing device which, when the temperature drops below a certain minimum value, switches off the entire arrangement.

11. The arrangement as claimed in claim 1, which comprises connection to a device for sensing operating duration designed such that the evaluating and indicating unit (24) is activated only after a certain minimum operating duration.

12. The arrangement as claimed in claim 1 with a device for sensing operating duration, which comprises being designed such that the delivery rate of the pump (4) which delivers the hydraulic fluid through the hydraulic circuit is increased only after a certain minimum operating duration.

* * * * *